United States Patent [19]
Hopkin

[11] 3,761,873
[45] Sept. 25, 1973

[54] SONAR APPARATUS

[75] Inventor: Peter Roy Hopkin, Hadleigh, Benfleet, England

[73] Assignee: Smiths Industries Limited, London, England

[22] Filed: Dec. 21, 1971

[21] Appl. No.: 210,446

[30] Foreign Application Priority Data
Dec. 24, 1970  Great Britain.................. 61,305/70

[52] U.S. Cl............................... 340/3 R, 343/5 DP
[51] Int. Cl............................................... G01s 9/68
[58] Field of Search..................... 340/3 R, 3 C, 3 F; 343/5 DP

[56] References Cited
UNITED STATES PATENTS

| | | | |
|---|---|---|---|
| 3,683,403 | 8/1972 | Okino | 340/3 R X |
| 3,363,226 | 1/1968 | Murphree | 340/3 R |
| 3,553,711 | 1/1971 | Kurimura et al. | 340/3 R X |
| 3,296,580 | 1/1967 | Hopkin | 340/3 R |

Primary Examiner—Richard A. Farley
Attorney—William D. Hall et al.

[57] ABSTRACT

Sonar apparatus includes a storage unit having a multiplicity of discrete storage locations that serve to store representation of echo-information samples taken from the echo-reception waveform of a combined receiving-transmitting transducer. Writing of sample representations into the store covers a short period up to receipt of the echo from the bottom of the water, and reading out of the representations, at a slower rate, to the continuously-circulating stylus of a chart recorder via an otherwise closed isolation gate is triggered from the recorder to commence with a selectively-variable phasing in the stylus circulation. With the sampling frequency used, the writing-in period is longer than required to fill the storage unit to capacity and only those samples occurring in a fixed interval up to receipt of the bottom echo, and corresponding to a predetermined partial range down to the bottom, are as a result retained for subsequent read out and expanded-scale recordal. In a modified construction writing is initiated from the transmission pulse and continues until the expiry of a selectively-variable period of time determined by a monostable circuit. The sample representations are stored in an array of capacitors or in digital form in one or more shift registers and where a single shift register is used, may be entered by clocking in samples taken from a waveform which is derived by pulse-frequency modulation to have a mark-to-space ratio in accordance with received-echo amplitude.

13 Claims, 6 Drawing Figures

SONAR APPARATUS

BACKGROUND OF THE INVENTION

This invention relates to sonar apparatus.

It is necessary in certain applications of sonar apparatus to provide a display of received echoes in which the time base of the display and a signal selected as a reference are synchronized to one another. This requirement arises, for example, with sonar apparatus used for fish detection where the echoes to be displayed are from fish and the reference signal is the echo signal arising from the water bottom.

Examples of sonar apparatus that have earlier been proposed for use in the latter respect are described in British Patent Specification Nos. 785,001, 839,131, 839,132 and 868,146. Each of these includes a magnetic-drum store that is operated to store a complete representation of the sequence of echoes received, and then to read this out for display after reception of the echo from the bottom of the water. The magnetic drum is rotated at constant speed, and it is necessary in order to achieve the desired 'bottom-locked' display to synchronize the display time-base to the reading out process. In particular it is necessary to trigger commencement of the time base from the reading out of the stored bottom-echo from the drum. The display device used is a cathode-ray tube and it is readily possible with this to achieve the precision of time-base triggering necessary. Difficulty arises, with the earlier forms of apparatus however, where a more permanent dislay is to be provided since this implies use of a chart recorder and with conventional chart recorders there is no provision for synchronizing the recording time-base to an externally-applied signal.

With conventional chart recorders a stylus for marking the chart is driven continuously around a closed path to traverse the chart repeatedly at constant speed. There is no facility for controlling the phasing of the stylus cycle that would enable it to be synchronized accurately to an externally-derived reference signal as required for the above-mentioned 'bottom-locked' display purposes in the earlier forms of apparatus. The difficulty can be overcome using a special form of chart recorder as described in British Patent Specification No. 852,566, in which the stylus is moved intermittently rather than continuously. However, this latter form of recorder has significant constructional disadvantages as compared with the conventional form and arising from the need for discontinuous stylus-movement.

There is however, a further aspect of the earlier forms of sonar apparatus that presents a difficulty, and this arises particularly where it is desired to provide a display that will enable one particular region or partial range of the water to be examined in detail. With the earlier froms of apparatus the scale to which the display representation of the relevant region is provided depends on the speed of rotation of the magnetic drum and the display time-base. In general therefore, and especially where a chart recorder is to be used, it is not possible to provide for any significant or readily-adjustable variation in the scale of the resultant display representation.

It is an object of the present invention to provide sonar apparatus that can be used to overcome the difficulties and disadvantages experienced with the earlier forms of sonar apparatus referred to above. More particularly, it is an object of the invention to provide a form of sonar apparatus which may utilize a chart recorder involving a continuously-moving stylus, but which nonetheless is capable of providing a bottom- or other reference-locked display. Additionally, it is an object of the invention to provide sonar apparatus that is adapted to the provision of an expanded display-representation that may be readily varied in scale.

SUMMARY OF THE INVENTION

According to one aspect of the present invention sonar apparatus comprises a transducer for providing an echo-information signal in accordance with received acoustic-wave echoes, utilization means for utilizing echo information contained within said signal, storage means having a multiplicity of storage locations, writing means for writing representations of discrete samples derived in succession from said echo-information signal into successive ones of said storage locations, reading means operable selectively to read out to said utilization means the signal-sample representations stored at said storage locations, and means for triggering operation of said reading means to read out the signal-sample representations to said utilization means.

Where scale-expansion is required, the stored signal-samples may be read out at a lower speed than that at which they are written into the storage means.

The references to 'acoustic' made in the preceding paragraphs and elsewhere in this specification are not intended to imply limitation to frequencies within the audible-sound range.

BRIEF DESCRIPTION OF THE DRAWINGS

Sonar apparatus in accordance with the present invention, for use on a sea-going ship, will now be described, by way of example, with reference to the accompanying drawings, in which.

DESCRIPTION OF THE PREFERRED EMBODIMENTS

Figure 1:
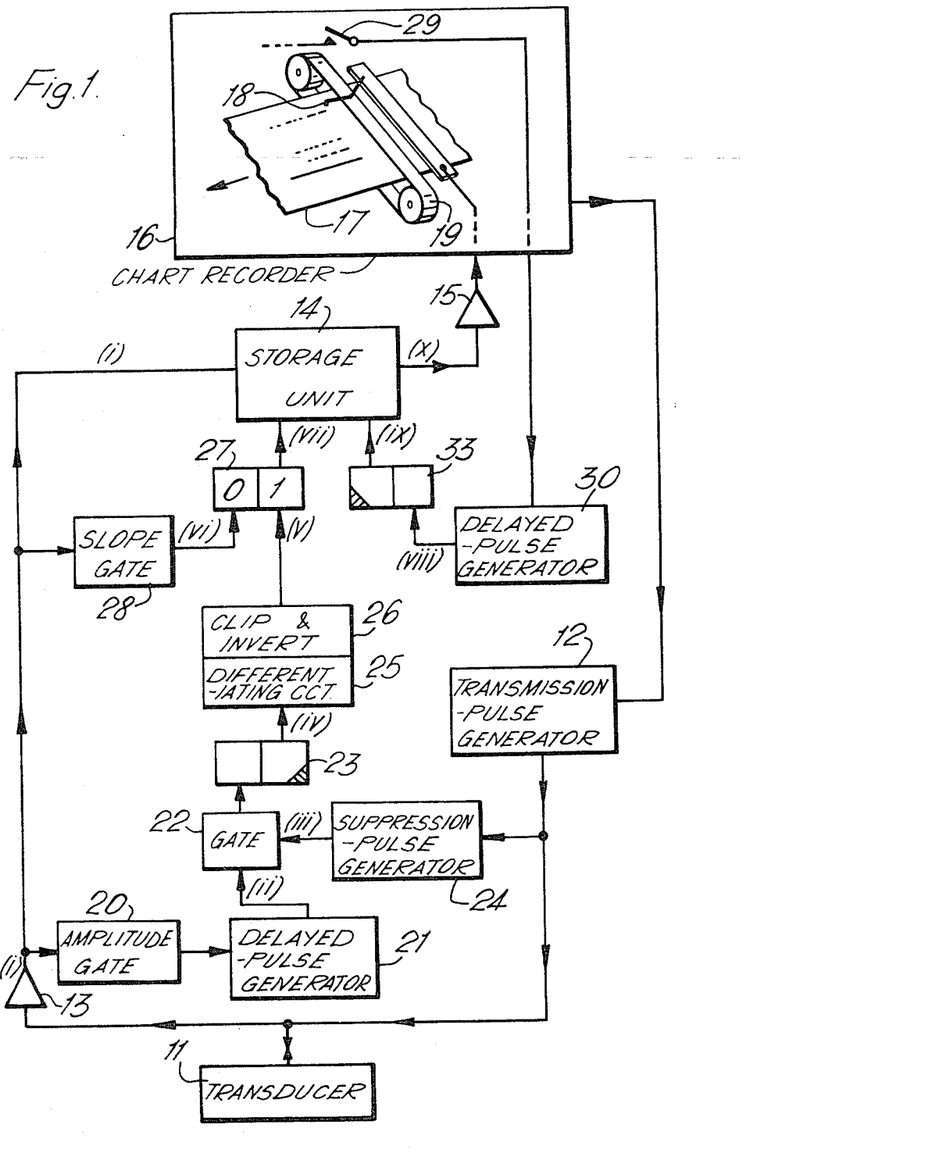
FIG. 1 is a block schematic representation of the sonar apparatus.

Referring to FIG. 1, transmission and reception of acoustic wave-energy by the sonar apparatus is effected in this example by a single transducer 11 that is mounted on the hull of the ship to be directed downwardly. The transducer 11 is energized recurrently by a transmission-pulse generator 12 to transmit a succession of pulses of acoustic-wave energy downwardly towards the sea bed. A signal in accordance with the echoes received in the intervals between the transmitted pulses is supplied from the transducer 11 via a pre-amplifier 13 to a storage unit 14. The storage unit 14 has a multiplicity of distinct storage locations and is operable during each interval between transmitted pulses to sample the output waveform of the pre-amplifier 13 and to store representations of the successive samples at the different locations. Operation of the storage unit 14 in this way is confined to a short interval immediately preceding reception of the echo from the sea bed. Reception of the sea-bed echo is used to arrest the sampling operation such that the unit 14 then retains signal-representations of just the leading edge of the sea-bed echo and the immediately preceding echoes received from a short range above the sea bed. These signals are read out from the unit 14 and are then supplied via an amplifier 15 for appropriate recording by a chart recorder 16.

The recorder 16, being of conventional form, records the echoes on a moving chart 17 that is marked by a stylus 18 carried by an endless belt 19. The belt 19 is driven continuously to cause the stylus 18 to be carried round a closed path traversing the chart 17 cyclically and at constant speed. The signals read out from the unit 14 and amplified by the amplifier 15 are applied to energize the stylus 18 as it traverses the chart 17 during the cycle. The chart 17 is thus marked in accordance with the representations of echoes stored by the unit 14 in respect of the selected short range above the sea bed, a fresh set of representations being stored and then recorded on the chart 17 in this way in respect of each pulse transmitted by the transducer 11.

Operation of the transmission-pulse generator 12 to cause transmission from the transducer 11 is triggered from the chart recorder 16 with a pre-selected phasing in each stylus cycle. The result of successive traversals of the stylus 18 across the chart 16 is therefore to build up along the advancing chart 17 a cumulative record of the region immediately above the sea bed. The recording on the chart 17 of each successive echo from the sea bed, like the transmission of each successive pulse from the transducer 11, is synchronized directly to the time base established by the cylcic movement of the stylus 18; the sea bed as a result appears in the cumulative record as a straight line of markings running lengthwise of the chart 17.

Details of the sonar apparatus, and of the manner in which the operation of the storage unit 14 is synchronized both to reception of the sea-bed echo and to the stylus cycle of the recorder 16, will now be described. The signal waveforms which are applicable in these respects to the various parts of the apparatus, are indicated in FIG. 1 and in the description itself, simply by means of numbers (i) to (x) that refer to the correspondingly-annotated waveforms of FIG. 2.

Figure 2:
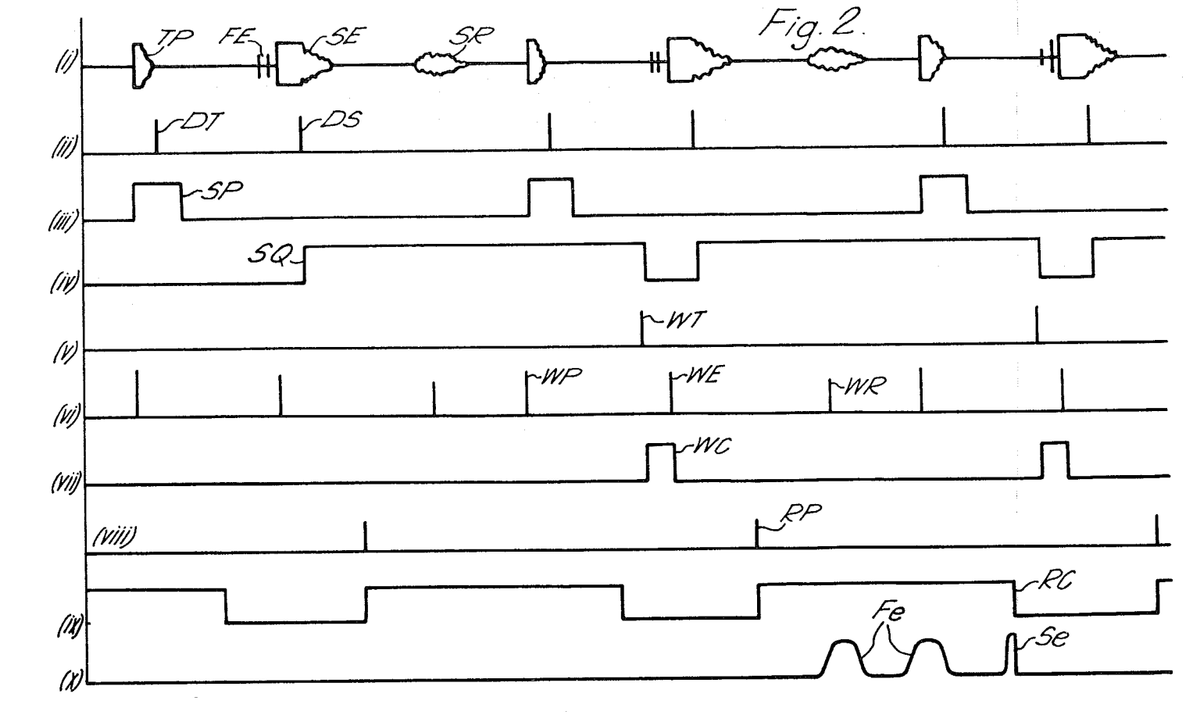
FIG. 2 shows signal waveforms applicable to the sonar apparatus of FIG. 1.

The echoes received from the sea bed, fish and other objects in the water are weak, and the output signal of the transducer 11 requires considerable amplification in the pre-amplifier 13 before storage can take place. The output wavefrom (i) of the pre-amplifier 13 includes break-through TP of the transmission pulse, and signals FE, SE and SR in accordance respectively with fish echoes, the sea-bed echo and any re-echo of the sea-bed echo. With the high gain necessary, the pre-amplifier 13 may be saturated by the signal break-through TP of the transmission pulse, and also possible by the sea-bed echo-signal SE itself.

A gate 20 is provided to select those of the signals supplied by the pre-amplifier 13 that exceed a preset threshold level. The signals selected, more particularly the signals TP and SE of waveform (i), are applied from the gate 20 to trigger a pulse generator 21 and generate from this the waveform (ii) with pulses DT and DS delayed slightly with respect to the corresponding signals TP and SE. The output waveform (ii) of the pulse generator 21 is applied to a gate 22 that is controlled to suppress each successive pulse DT but to pass the pulse DS on to trigger a monostable circuit 23. To this end the gate 22 is supplied with the output waveform (iii) of a pulse generator 24 which is triggered from the transmission-pulse generator 12 to emit a pulse SP beginning with the transmission of the sounding pulse. The pulse SP, which has a duration sufficient to bracket the delayed pulse DT and any signals (not shown) arising from short-range echoes that are likely to be passed by the amplitude-selection gate 20, is applied to the gate 22 to inhibit passage of the pulse DT and any associated short-range echo-signals, to the monostable circuit 23.

The monostable circuit 23 has an output waveform (iv), being triggered by the pulse DS to generate a pulse SQ with a duration that is only slightly less than the interval between tramission of successive sounding pulses. Once triggered the circuit 23 remains unresponsive to any subsequent pulse supplied from the gate 22 for the duration of the generated pulse SQ, becoming responsive again only a short interval before the expected reception of the next sea-bed echo and consequent generation of the next pulse DS.

The output waveform (iv) of the monostable circuit 23 is supplied to a differentiating circuit 25. The pulses that are derived by the circuit 25 from the leading and trailing edges of the pulse SQ are then respectively suppressed and inverted by a clipping-and-inverting circuit 26. The resultant waveform (v) with pulse WT derived from the trailing edge of the pulse SQ, is applied to a bistable circuit 27 so that the pulse WT triggers the circuit 27 from its 'low' or '0' state to its 'high' or '1' state. The circuit 27 is reset to its '0' state by a pulse WE of the output waveform (vi) of a gate 28. The gate 28 responds to the signals of waveform (i), in particular signals, TP, SE and SR, that exceed predetermined slope thresholds, to produce corresponding pulses WP, WE and WR; in general the leading edges of signals such as the signals FE received from fish, are not as steep as those of the signals TP, SE and SR and it is the discriminant of slope that is used for selection of these latter signals. To this end the gate 28 has a circuit which is of the form described with reference to FIGS. 3 and 4 of British Patent Specification No. 878,111, and which includes a differentiating circuit to differentiate the signals after they have been limited in amplitude, and an amplitude-selection circuit to select from the output of the differentiating circuit only such signal-pulses as exceed a pre-set threshold amplitude.

A pulse WC of waveform (vii) is applied from the bistable circuit 27 to the storage unit 14 while the circuit 27 remains in its '1' state, that is to say, throughout the short interval between the pulse WT from the circuit 26 and the following resetting pulse WE. The storage unit 14 responds to this pulse WC to store representations of successive samples of the output waveform (i) of the pre-amplifier 13. The process of sampling and storage continues throughout the duration of the WRITE pulse WC so as to cover echo signals, such as the fish-echo signals FE, arising from within a small range down to the sea bed, and to terminate with storage of a sample taken from the leading edge of the sea-bed echo-signal SE.

The reading out of the stored representations from the storage unit 14 is controlled from the recorder 16 and is accordingly maintained in synchronism with the triggering of the transmission-pulse generator 12. In this respect the recorder 16 includes a set of contacts 29 that are positioned to close transitorily at some fixed point in the stylus cycle. Closure of the contacts 29 trigger a delayed-pulse generator 30 to produce in its output waveform (*viii*) a short pulse RP that is delayed by an adjustable interval with respect to the closing of the contacts 29. The pulse RP is itself used to trigger a monostable circuit 33 to generate a pulse RC in its output waveform (*ix*) applied to the storage unit 14. The storage unit 14 responds to the pulse RC to read out the representations stored in the various storage locations. The READ pulse RC has an adjustable duration that, as illustrated, may readily be substantially longer than that of the WRITE pulse WC, and this allows the rate at which stored representations are read out to be substantially less than the rate of their storage. With the lower rate of read out the sequence of signals (fish-echo signals FE and sea-bed echo-signal SE) sampled and stored by the storage unit 14 during the WRITE pluse WC, is reconstructed during the READ pulse RC in a time-expanded form, comprising fish-echo signals Fe and sea-bed echo-signal Se in the output waveform (*x*) of the unit 14. These signals are supplied to the stylus 18 and are thereby recorded with a corresponding time-scale expansion on the chart 17. The particular position across the chart 17 at which the sequence is recorded is dependent on the phasing of the READ pulse RC in the stylus cycle; this may be varied simply by adjustment of the delay introduced in the generation of the pulse RP by the delayed-pulse generator 30.

It is possible for the pulse RP to be generated directly from a contact set or other switching device that can be adjusted in position relative to the belt 19 so as to be closed transitorily when the stylus 18 reaches the required position across the chart 17. Greater flexibility is however obtained by using the scheme of fixed-position triggering and variable delay embodied in the use of the set of contacts 29 and the adjustable delayed-pulse generator 30 of the apparatus shown in FIG. 1. In this respect also, it is possible for the contacts 29 to be the same as those used in the recorder 16 to trigger the transmission-pulse generator 12. Where the recorder involved incorporates an adjustable transmission-phasing control, however, it will normally in these latter circumstances be necessary to couple the delay control of the generator 30 to this in such a way as to ensure that the phasing of the READ pulse RC remains independent of adjustment of the transmission phasing.

Although a simple arrangement utilizing a common transducer 11 for transmission and reception is shown in FIG. 1, separate transducers may be used instead. Furthermore, where it is likely that the apparatus will need to be used as a conventional instrument without the storage facility, either alternatively or in a dual-scale mode, then it may in these circumstances be convenient to provide a pre-amplifier, separate from the pre-amplifier 13, specially to feed the storage unit 14.

A signal storage unit suitable for use as the storage unit 14 and using discrete capacitors as storage elements will now be described with reference to FIG. 3.

Figure 3:
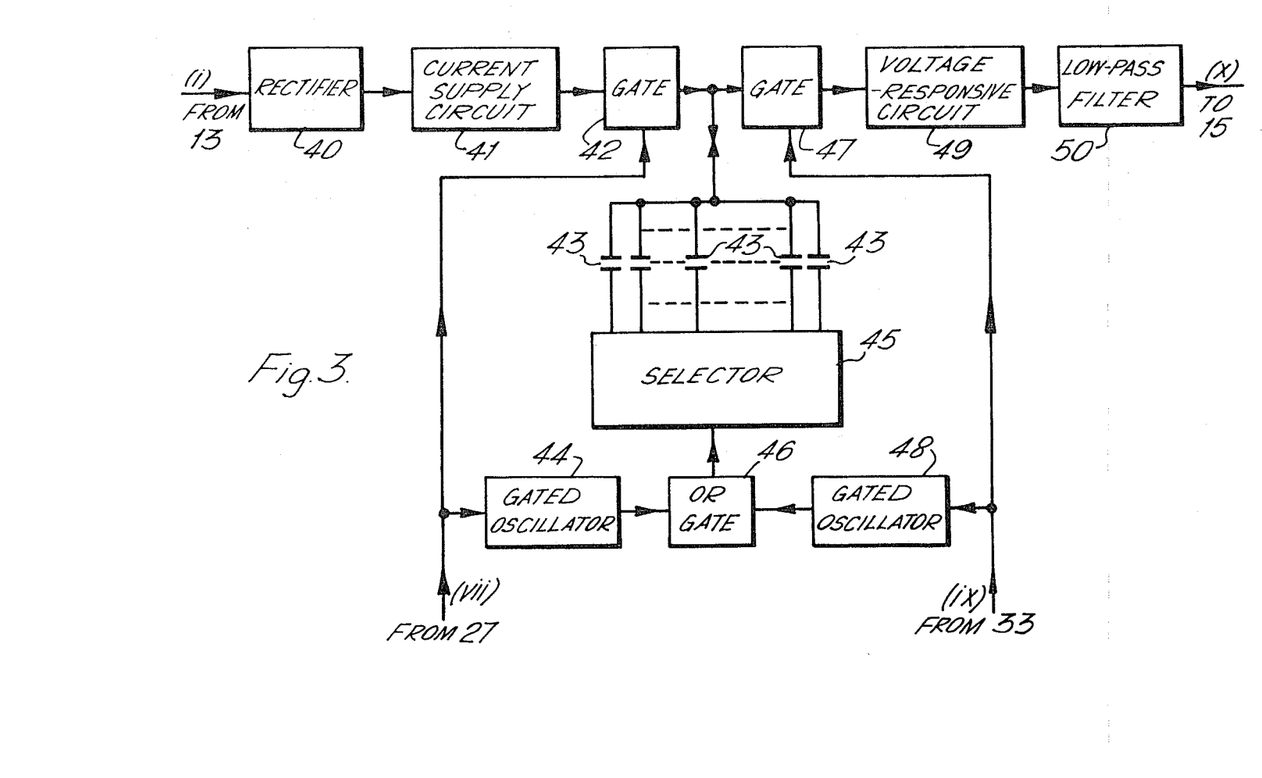
FIGS. 3 to 5 are block schematic representations of signal storage units that may be used as alternatives to one another in the sonar apparatus of FIG. 1.

Referring to FIG. 3, the output waveform (*i*) of the pre-amplifier 13 is supplied via a rectifier 40 to a current-supply circuit 41. The circuit 41 is connected via a gate 42 to a common rail of an array of capacitors 43, and while the gate 42 is open supplies current in accordance with waveform (*i*) to charge the capacitors 43 of the array individually. The gate 42 is controlled by the output waveform (*vii*) of the bistable circuit 27 so as to be open to pass the charging current to the capacitors 43 for the duration of the WRITE pulse WC only. The waveform (*vii*) is also used to control a gated oscillator 44 to supply a train of pulses throughout the WRITE pulse WC to a sequnetial selector 45 via an OR gate 46. The selector 45 establishes connection with one capacitor 43 at a time to complete a charging circuit for this through the gate 42 from the circuit 41. Successive stepping pulses applied to the selector 45 from the gate 46 cause it to step on to select the capacitors 43 of the array in turn and thereby submit them is sequence to charging from the circuit 41. As each capacitor 43 is selected in this way so the voltage across it is changed in the interval between stepping pulses from its previous value to a new value representative of the amplitude of the waveform (*i*) at that time. This voltage representation is retained by the capacitor 43 when the next stepping pulse from the OR gate 46 steps the selector 45 on to select the next capacitor 43 in the sequence. Thus at the end of the train of pulses from the oscillator 44 the capacitors 43 retain volages representative of successive samples of the waveform (*i*) taken during the WRITE pulse WC and covering a partial range of the sea bed.

There are substantially more pulses in the train generated by the oscillator 44 than capacitors 43 in the array, but the selector 45 acts cyclically so as to select the first capacitor 43 of the array immediately following selection of the last. In these circumstances each capacitor 43 is normally subjected to several changes of charge during the period of the WRITE pulse WC, so that the representations finally retained relate only to echoes received within a fixed period from the end of the pulse WC. This intentional overrunning of the storage capacity of the unit 14 ensures that at the end of the pulse WC all capacitors 43 are storing representations derived from the current sounding. It furthermore allows for variations in the timing of reception of the sea-bed echo as between one sounding and the next and arising from changes in sea-bed contour and vertical motions of the ship.

The gate 42 closes at the end of the WRITE pulse WC and thereby disconnects the array of capacitors 43 from the charging circuit 41. The emission of pulses from the oscillator 44 ceases at the same time so that the selector 45 remains stationary with connection established to the capacitor 43 storing a representation of the last sample taken, namely of the leading edge of the sea-bed echo-signal SE occurring just in advance of the trailing edge of the pulse WC. There is no dissipation of any of the representations stored by the array at this time, not even from the capacitor 43 to which connection remains established by the selector 45, since closure of the gate 42 effectively isolates the common rail of the array. The storage unit 14 remains in the quiescent state until the pulse RC of the waveform (*ix*) is emitted by the monostable circuit 33 to produce read out from the capacitors 43 via a gate 47.

The waveform (*ix*), which is applied to the gate 47 to open this only during the READ pulse RC, is applied also to a gated oscillator 48 to cause this to supply a train of pulses to the selector 45 via the OR gate 46 throughout the period of the pulse RC. These pulses cause the selector 45 to step on from one capacitor 43 to the next through the array so as to read out in turn via the gate 47 the representations stored by the individual capacitors 43. The first pulse of the train causes the selector 45 to step on from the capacitor 43 storing the sea-bed representation so that the first representation read out through the gate 47 relates to the stored echo-sample that originated furthest in range from the sea bed. There are the same number of pulses in the train generated by the oscillator 48 as capacitors 43 in the array. Each capacitor 43 is therefore selected once only and in the sequence in which the retained representations were stored so as to provide read out of these representations in the same sequence and ending with the representation of the sea-bed echo.

The representations read out through the gate 47 from the array of capacitors 43 are supplied to a voltage-responsive circuit 49 that has an input resistance sufficiently high to avoid significant discharge of the caacitors 43 as connection is established to them in turn by the selector 45. Signals in accordance with the sample representations are supplied by the circuit 49 to the recorder stylus 18 via a low-pass filter 50. The filter 50 acts to reduce in the output waveform $(x)$ the effects of discontinuities which arise from the step-by-step selection process of the selector 45 and which would otherwise produce striations in the record on the chart 17.

The step-by-step selection process performed by the selector 45 is the same as that performed by well-known uniselector devices, but because of speed of operation and time accuracy needed in the present circumstances, an entirely electronic method is preferred. There are several known methods by which an electronic sequential selector or distributor can be constructed. It may include a simple binary counter of the ripple-through type operating either synchronously or asynchronously, with logic gates that are connected to the outputs of different combinations of the successive stages of the counter so as to operate switching devices associated with the inidividual capacitors 43, in turn. A shift register having parallel access may alternatively be used, the pulses from the OR gate 46 being applied to shift a single pulse from one stage of the register to the next and produce thereby the required sequence of connections from the stages; the number of stages in the register need be no more than the number of capacitors 43 in the array if the register is connected for cyclic operation with its output connected back to its input to form a ring around which the pulse can be shifted cyclically in accordance with the pulses supplied via the gate 46.

The area of the chart 17 occupied by the recording from the storage unit 14 is dependent on the speed of the stylus 18 and the pulse-recurrence frequency of the gated oscillator 48. The range down to the sea bed covered by this record is determined by the rate of sampling in the writing process and therefore by the pulse-recurrence frequency of the oscillator 44. The frequencies of the two oscillators 44 and 48 are preferably variable so as to enable the operator to vary both the partial range and the scaling with which it is recorded. Where a multi-range instrument is involved then it may be found desirable to arrange that the frequency control of the oscillator 48 is coupled to the range control of the recorder so that the area of the sea-bed time-expanded record is kept constant and independent of adjustment to the recorder range-control.

As indicated above, the number of pulses supplied by the oscillator 48 during the period of the READ pulse RC is equal to the number of capacitors 43 so that there is read out from each only once during that period. However, it is not essential for the number of pulses to be limited in this way. If more pulses are supplied then the selector 45 continues the selection process to repeat the read out of the stored representations. This is of advantage in the event that a cathode-ray-tube display rather than a chart recorder is used, since the repeated read out may then serve to maintain a substantially constant 'paint' of the stored sequence of echoes on the tube. In the latter circumstances it would probably be desirable to arrange that the pulse-recurrence frequency of the gated oscillator 48 is equal to, or greater than, that of the oscillator 44 so that a large number of repeated read outs can be obtained to enhance the appearance of the display. Where an unrectified 'A'-scan form of display is to be used, then the waveform $(x)$ may be applied to modulate the amplitude of a 'carrier' oscillation supplied to the cathode-ray tube.

The functions of the two gates 42 and 47 in the arrangement of FIG. 3 may alternatively be provided by a simple change-over switch connected to the common rail of the array of capacitors 43 and having an intermediate position in which there is complete isolation of the array from both circuits 41 and 49. However, it may be possible for these functions to be dispensed with altogether if it can be accepted that the capacitor 43 that remains connected through the selector 45 in the quiescent interval between the WRITE and READ pulses WC and RC, will provide a spurious representation at read out. Furthermore, the functions of the two gated oscillators 44 and 48 may be provided instead by a single gated oscillator that is operated at one or the other of two frequencies depending upon whether the gating comes from the circuit 27 or 33. As a further alternative in the latter respect, a continuously-running oscillator with associated gating and frequency-diversion circuits may be used.

With the storage unit of FIG. 3, the signal samples are stored directly as voltage analogues, but it is also possible to store them in digital form. Although there are many forms of digital storage device that may be used in the latter respect, the shift register has been found to be particularly suitable. Shift registers of adequate performance and capacity are becoming available at low cost through the combination of large-scale-integration (L.S.I.) and metal-oxide-silicon (M.O.S.) techniques, and an arrangement using shift registers of this kind and suitable to provide the storage unit 14 of FIG. 1, will now be described with reference to FIG. 4. Component parts of the arrangement of FIG. 4 that correspond in function to parts of the arragnement of FIG. 3, are given the same references as used for those parts in FIG. 3.

Figure 4:
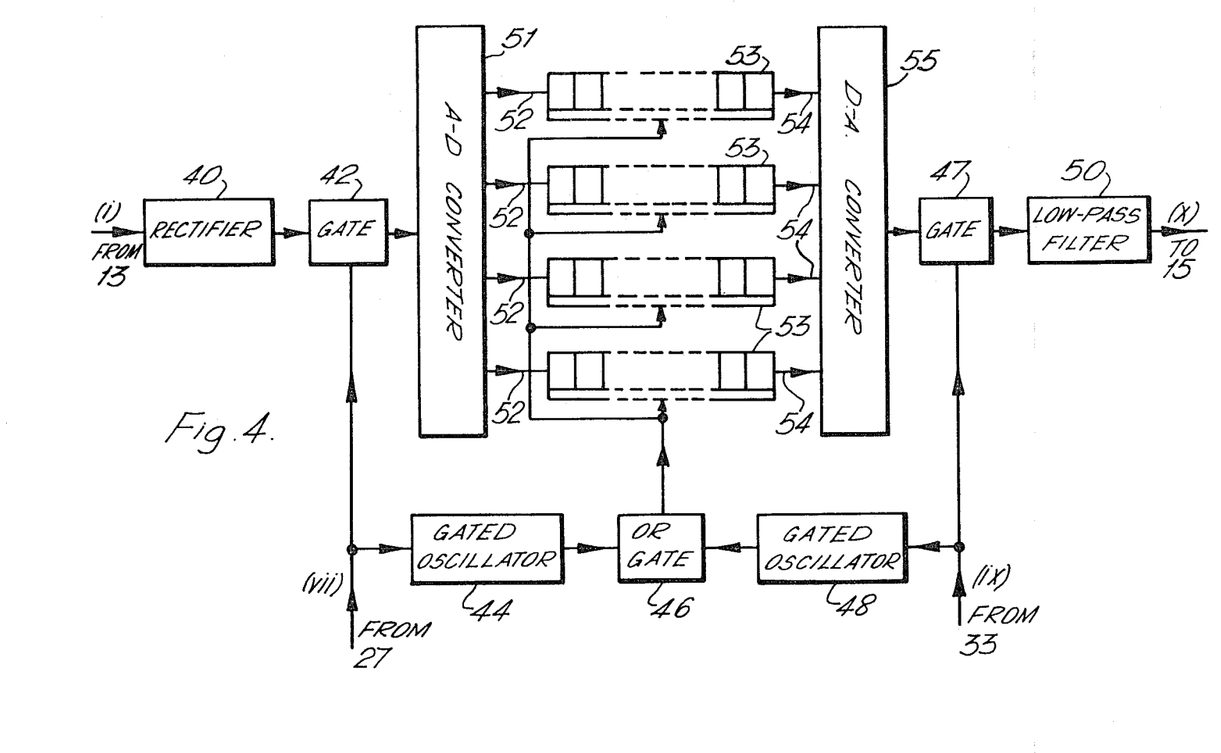

Referring to FIG. 4, the waveform $(i)$ rectified by the rectifier 40 is in this case passed during the WRITE pulse WC via the gate 42 to an analogue-to-digital converter 51 that derives a binary-word encoding of the instantaneous signal-amplitude. The binary word in this case is of four digits that are signalled in parallel on four output leads 52 respectively of the onverter 51 and are conveyed to respective multi-stage shift-registers 53. The OR gate 46 is coupled to the shift-pulse input of each register 53 and so successive pulses generated by the oscillator 44 during the WRITE pulse WC cause the four digits to be entered in, and then shifted from one stage to the next along, the four registers 53. Each pulse causes a new four-digit encoding of the instantaneous amplitude of waveform (*i*) to be entered in the registers 53, and this process continues until the WRITE pulse WC terminates to bring the supply of shift pulses to an end in response to reception of the sea-bed echo. The shift registers 53 then hold a multiplicity of binary words representative of successive samples of the waveform (*i*). The number of binary words held depends primarily on the number of stages in each register 53 (in general at least twenty five) and it will normally be the case that the binary words held relate only to echoes, including the leading edge of the sea-bed echo, received within a short period of the end of the pulse WC; the earlier-derived words will have been shifted along to overflow from the registers 53 by the entry and shifting of the later words.

The outputs of the registers 53 at which the overflow digits appear, are connected via individual leads 54 to a digital-to-analogue converter 55. The converter 55 responds to the four digits signalled in parallel on the leads 54 to derive a signal having an amplitude in accordance with the binary word so represented. This signal is applied to the gate 47.

The gate 47 is opened only by the READ pulse RC. Thus it is not until the reading and recording operation is to commence that signals derived by the converter 55 from the overflow-outputs of the registers 53, are passed on in the waveform (*x*) to the recorder stylus 18 via the low-pass filter 50. The oscillator 48 at this time commences to supply pulses via the OR gate 46 to shift the words stored in the registers 53 to overflow in succession to the converter 55 and provide the desired read out to the recorder 16 via the amplifier 15.

If repeated read out from the storage unit 14 is required with the arrangement of FIG. 4, for example where a cathode-ray-tube display is involved, then this may be achieved by establishing a feedback path around each register 53 during the READ pulse RC, such that each word overflowing is re-entered in them.

The number of digits provided by the converter 51 in the encoding of the echo signal, and accordingly the number of shift registers 53 required, determines the accuracy with which the amplitude level of each signal can be reconstructed by the converter 55. For some fishing applications, however, the specific amplitudes of fish echoes are of little interest, the important thing being whether they exceed some pre-selected threshold level. In these latter circumstances only one shift register need be used and the converters 51 and 55 are then not required, it being necessary simply to provide that only signals in excess of the selected threshold-level are entered (for example as the level or digit '1') into the register in response to the applied shift pulses.

Although with the arrangement described above with reference to FIG. 4, the converters 51 and 55 are not required to operate with precision, they are nonetheless rather complex devices and if a large number of digit places in the encoding of each signal is necessary in order to obtain good fidelity on a display having a large dynamic range, the method may become uneconomic. An alternative method of using a shift register as the storage device, in which almost stepless control of the amplitude parameter is achieved and the use of complex converters avoided, will now be described with reference to FIG. 5. As with the arrangement of FIG. 4, component parts that correspond in function to parts of the arrangement of FIG. 3, are given the same references in FIG. 5 as used for those parts in FIG. 3.

Figure 5:
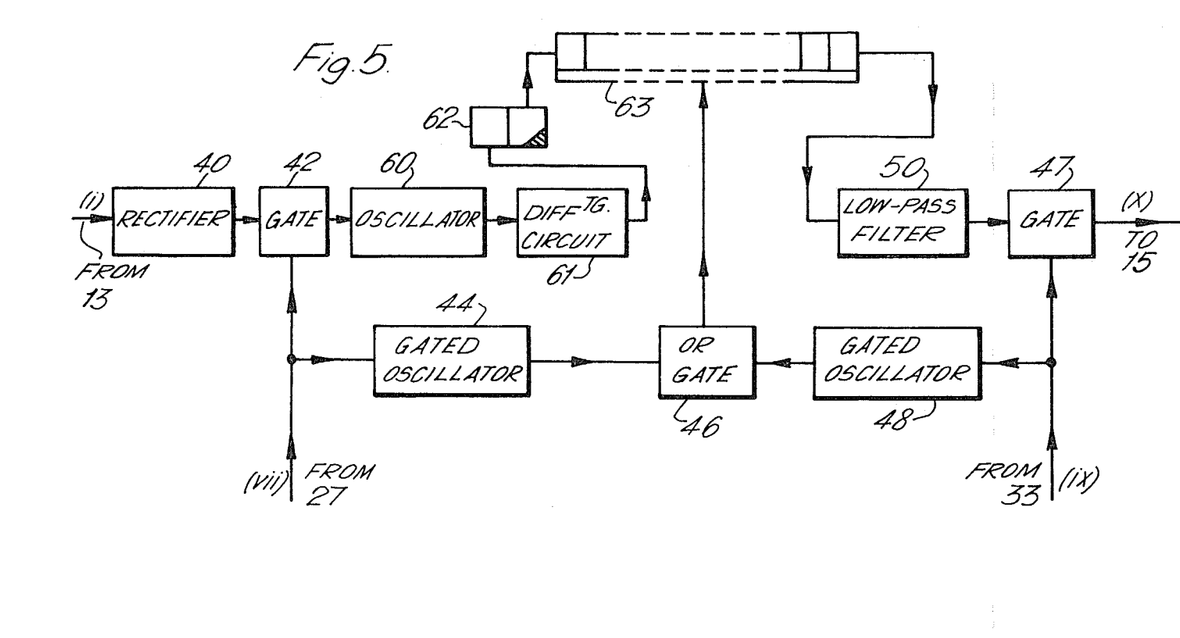

Referring to FIG. 5, the waveform (*i*) rectified by the rectifier 40 is supplied via the gate 42 during the WRITE pulse WC to modulate the frequency of an oscillator 60. The modulation may be in either sense, but it will be assumed for this description that increase in amplitude of the rectified waveform increases the output frequency. In these circumstances it is arranged that the frequency of the oscillator 60 is the same as that of the oscillator 44 when the amplitude of the waveform (*i*) is at a level corresponding to saturation or maximum density of the marking provided by the stylus 18 (or, if a cathode-ray-tube display were provided, maximum deflection of the trace). In addition it is arranged that the periodic time of the oscillation produced at the threshold or minimum amplitude level of the waveform (*i*) is equal to the time-equivalent of the range resolution required.

The frequency-modulated oscillation provided by the oscillator 60 is supplied to a differentiating circuit 61 and the pulses of one of the two senses derived are supplied to trigger a monostable circuit 62 (it may be found necessary to square the output waveform of the oscillator 60 before application to the circuit 61). The monostable circuit 62 is coupled to a single shift register 63 to signal the level or digit '1' to its input when the circuit 62 is in its triggered, quasi-stable state, and the level or digit '0' when in the untriggered, stable state. The circuit 62 once triggered by a pulse from the circuit 61 remains in the quasi-stable state for a period almost equal to the pulse-recurrence period of the pulses that are supplied from the oscillator 44 and via the OR gate 46 to the shift-pulse input of the register 63; this ensures that althouth there is no synchronization between the oscillators 44 and 60 each level or digit '1' signalled by the circuit 62 is in fact entered in the shift register 63.

The monostable circuit 62 has a very short recovery time so that it can be triggered and then re-triggered repeatedly at almost the maximum frequency of the voltage-controlled oscillator 60, that is to say at almost the frequency of the shift pulses derived from the oscillator 44. At the maximum frequency of the oscillator 60 therefore, the monostable circuit 62 remains in its quasi-stable state almost without interruption. Conversely, at the minimum frequency the circuit 62 remains in its stable state for most of the time. Thus the output of the monostable circuit 62 consists of a train of pulses the mark-to-space ratio of which is modulated from almost 100 percent at maximum amplitude to almost 0 percent minimum amplitude of the signals to be stored.

As successive pulses are supplied from the oscillator 44 so there is propagated into the shift register 63 the sequence of binary digits signalled from the monostable circuit 62. This process ceases when the WRITE pulse WC terminates in response to reception of the sea-bed echo, and there then remains stored in the register 63 digital representations of only those echoes, including the sea-bed echo, received within a short period of the end of the pulse WC. These representations are read out in turn from the shift register 63 during the READ pulse RC in response to the supply of shift pulses from the oscillator 48 at this time.

The output waveform of the shift register 63 normally contains a high-frequency component arising from the rapid switching between the '0' and '1' levels, and a low-frequency component arising from variation in the average amplitude of the waveform throughout the time equivalent of the range resolution. Thus by passing the output waveform of the shift register 63 through the low-pass filter 50 and thence via the gate 47 and amplifier 15 to the recorder 16, the envelope of the resultant waveform ($x$) corresponds closely in time-expanded form to the envelope of that part of the waveform ($i$) passed by the gate 42.

If repetition of the sequence of digits stored in the register 63 is required then this can be obtained by arranging that a feedback path from the output to the input of the register 63 is established via one or more gating stages during the READ pulse RC.

In the arrangement of FIG. 5 only one shift register, shift register 63, is required but it must have a large number of stages and be capable of operating at a higher shift frequency than each of the registers 53 used in the arrangement of FIG. 4.

There are other methods by which signal amplitude could be stored in the shift register 63 as a sequence of digits '0' and '1', but these involve the use of pulse-code modulation techniques which are more complex than the method adopted in the arrangement of FIG. 5.

While the methods of signal storage which have been described above with reference to FIGS. 3 to 5 are particularly useful for producing a seabed-locked record or display, they can also be applied to the locking of the record or display to any other reference signal. For example if the reference signal is chosen to be the transmission pulse, a delayed-pulse generator triggered at the instant of the transmission pulse can be used to produce a transmission-locked, scale-expanded record or display of a partial range at any position within the complete range. Since the signals to be stored in this case occur after the reference signal, the output of the delayed-pulse generator may be used to start (or alternatively to terminate) the WRITE period. Both seabed-locked and transmission-locked scale-expanded records of displays may be provided in the one instrument if desired.

Two or more degrees of scaling may be provided on the same chart record. For example part of the chart can be used to display the conventional echo record and part to display a scale-expanded portion of this. This form of record is particularly advantageous for small inshore fishing vessels where lack of space in the wheelhouse prevents the fitting of a separate seabed-locked recorder.

All the facilities of the standard echo-sounder recorder such as, range-changing and transmission-phasing, may be incorporated in the arrangements described above, and the seabed-lock facilities may be switched in or out as required. The only additional facilities required by the recorder are means for triggering the READ circuits of the storage unit 14 under control of the stylus 18, and means for feeding the output stage supplying the stylus 18, with the output waveform from the unit 14 instead of the output signal of the normal input amplifier. The operator will be required to ensure that the recorder range and, or alternatively, the transmission phasing, are set so that the partial range to be displayed in the time-expanded portion of the record does not occur during the READ period.

In all the arrangements described so far, the signals to be displayed are stored so they can be read at a time and rate required by the recording or display device. However, a change in rate of information implies a change in the bandwidth required to transmit it. An example in which this property can be usefully employed arises in telemetry. Thus, in an acoustic telemetry system intended to provide echo soundings from a transducer mounted on a trawl headline, the bandwidth required for the acoustic link can be reduced by storing the echo signals and reading out at a slower rate into the acoustic-link transmitter. This will enable a greater range of the acoustic link, or reduction in transmitter power, to be achieved.

Deep-draught vessels such as tankers and bulk carriers, frequently have very small clearances when navigating coastal waters and dredged channels. At these times there is need for a sounding record of such a scale as to enable small changes in depth to be easily discerned. A typical requirement is for a depth of some twenty feet to be represented across the full width of recording paper that is some eight inches wide. Such a requirement is difficult to meet with conventional recording systems but can be achieved with ease using the present invention. A simplified form of the sonar apparatus of FIG. 1, that can be used in the latter respect, will now be described with reference to FIG. 6.

Figure 6:
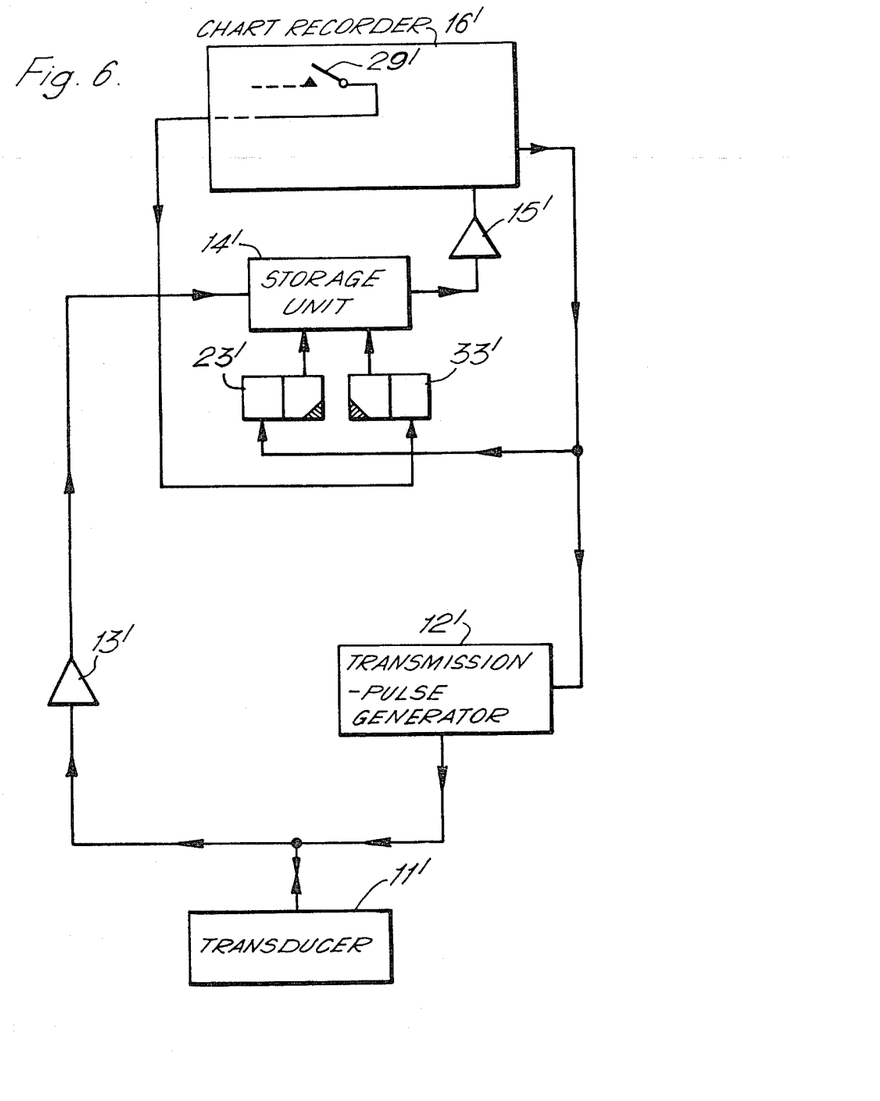
FIG. 6 is a block schematic representation that is illustrative of a modified form of the sonar apparatus of FIG. 1.

Referring to FIG. 6, the WRITE pulse for controlling the storage unit 14' to store representations of successive samples of the echo-waveform supplied from the transducer 11' via the pre-amplifier 13', is in this case generated by a monostable trigger circuit 23'. The circuit 23' is triggered from the chart recorder 16' at the same time as the transmission-pulse generator 12'. Signal samples are therefore clocked into the storage unit 14' continuously throughout the period from the triggering of transmssion until the monostable circuit 23' reverts to its quiescent, stable state after a time corresponding to the greatest range to be recorded.

The signal samples stored by the unit 14' are read out for supply to the chart recorder 16' via the amplifier 15', under control of a READ pulse supplied by a monostable circuit 33' that is triggered directly from contacts 29' within the chart recorder 16'. The READ pulse, which is initiated by the closing of the contacts 29' when the stylus of the recorder 16' reaches the scale zero at the edge of the chart, has a duration long compared with that of the WRITE pulse and substantially equal to the time taken for the stylus to pass across the full width of the chart. In this way substantial scale expansion is achieved.

The range resolution of the expanded display provided by the recorder 16' is determined by the number of samples stored by the storage unit 14', and will generally be greater than that required for fish detection purposes. However, representation of echo amplitude as a scale of half tones is seldom important for navigational purposes and the unit 14' need only store the presence or absence of signals above a predetermined threshold level.

On some large vessels transducers are fitted in two or more locations on the ship's hull. For example, a large tanker may have transducers fitted at the bow and at the stern, one or the other of them being selected for use by a switch at the recorder position. Alternatively, separate recorders may be provided for each transducer, or the echoes from all transducer positions may be superimposed on the same record. If in the latter case echoes from individual transducers are written into separate storage units operating in parallel, then the echoes from the different transducers can be displayed as separate traces on the one chart simply by reading out from the different storage units in turn as the stylus passes across the chart.

I claim:

1. In sonar apparatus that includes a transducer for providing an echo-information signal in accordance with received acoustic-wave echoes, and utilization means coupled to the transducer to utilize echo information contained within said signal, the combination comprising: multi-stage storage means having an input and an output, writing means operative to write representations of discrete samples derived in succession from said echo-information signal into the input of said storage means, said writing means including first clocking means operable throughout a period of time to clock each successive sample-representation at the said input from stage to stage in turn within the storage means towards said output, reading means operable selectively to read out to said utilization means the signal-sample representations stored in said storage means, said reading means comprising second clocking means operable following a said period of operation of said writing means to clock sample representations stored in said storage means through said storage means to emerge from said output, gate means coupled between the output of said storage means and the said utilization means, and means for triggering operation of said reading means to read out the signal-sample representations to said utilization means, said triggering means including means for controlling opening of said gate means to pass signal representations from said output to said utilization means only during operation of said second clocking means so as thereby to inhibit passage to said utilization means of any sample representations which are clocked through said storage means to overflow from said output during the writing-in period.

2. Sonar apparatus according to claim 1 wherein said storage means comprises a plurality of shift registers, and said writing means comprises means to derive periodically a plural-digit encoding of the said echo-information signal, and means to enter the individual digits of each said encoding into different ones of said shift registers.

3. Sonar apparatus comprising: a chart recorder including a stylus for marking a chart in accordance with signals supplied to the recorder, means for driving the stylus continuously around a closed path to traverse the chart, and means to supply a triggering signal at an instant dependent upon the position of the stylus around said closed path; a transducer for receiving acoustic-wave echoes to provide an echo-information signal in accordance with the echoes received; multi-stage shift-register means having an input and an output; writing means for writing into the shift-register means discrete representations of successive samples of said echo-information signal, said writing means comprising first clock-pulse means for clocking the successive signal-sample representations into the shift-register means at said input; reading means operative selectively to read out to said chart recorder signals in accordance with the signal-sample representations stored in said shift-register means, said reading means comprising second clock-pulse means operable to clock the stored signal-sample representations out from the output of the shift-register means in turn, and gate means coupled between said output and the chart recorder for controlling passage of signals from said output to the chart recorder; and operating means responsive to supply of said triggering signal to operate said reading means to read out the signal-sample representations to said chart recorder, said operating means comprising means to operate said second clock-pulse means to clock the stored signal-sample representations out from the output of said shift-register means, and means to open said gate means to pass any signal from said output to said chart recorder only during clocking out of the said stored signal-sample representations from said shift-register means by said second clock-pulse means.

4. Sonar apparatus according to claim 3 wherein said operating means includes means to delay operation of said reading means for a predetermined interval of time following supply of said triggering signal.

5. Sonar apparatus according to claim 3 including transmission means coupled to said chart recorder to transmit acoustic-wave pulses from said apparatus synchronized to the closed-path movement of said stylus, and wherein said writing means includes means for enabling said first clock-pulse means to clock said representations into said shift-register means throughout only a predetermined period following transmission of each said acoustic-wave pulse.

6. Sonar apparatus for providing a partial-range expanded-scale representation of received echo information, comprising a transducer for receiving acoustic-wave echoes to provide an echo-information signal in accordance therewith, multi-signal storage means having a multi-signal storage capacity N, means for writing into the storage means signal-representations of successive samples of said echo-information signal, said writing means including clocking means that is selectively operable to clock successive signal-samples into the storage means at a clocking frequency F, control means for operating said clocking means to clock the signal-samples into said storage means for a continuous period of time substantially longer than N/F, said storage means being operative to retain for read-out following said period of operation of said clocking means representations of only the last N signal-samples clocked into said storage means during said period so that the signal-sample representations retained in said storage means for read-out relate to only a final part of the range covered by all the signal-samples clocked into the storage means during said period, reading means for reading out from the storage means the N signal-sample representations stored by said storage means, the reading means being operative to read out said stored representations at a frequency lower than said clocking frequency F, and utilization means responsive to the signal-sample representations read out by said reading means to provide said expanded-scale representation of the echo information received from said part of said range.

7. Sonar apparatus according to claim 6 wherein said utilization means comprises a chart recorder that includes a stylus for marking a chart in accordance with the said signal-sample representations, means for driving the stylus continuously around a closed path to traverse the chart, and means to supply a triggering signal at an instant dependent upon the position of the stylus around said closed path, and wherein said reading means includes means to initiate said read out of said stored representations in response to supply of said triggering signal.

8. In sonar apparatus that includes a transducer for providing an echo-information signal in accordance with received acoustic-wave echoes, and utilization means coupled to the transducer to utilize echo information contained within said signal, the combination comprising: storage means including an array of capacitor devices; writing means operative to write representations of discrete signal-samples derived in succession from said echo-information signal into successive ones of said capacitor devices, said writing means comprising means to derive a current signal that varies in time in accordance with said echo-information signal, and means for supplying said current signal to charge the capacitor devices one at a time in turn; reading means operable selectively to read out to said utilization means the signal-sample representations stored in said array of capacitor devices, said reading means comprising a read-out path coupled to said utilization means, and means for connecting the capacitor devices to discharge into the said read-out path in turn so as thereby to form within said path a composite signal dependent on said signal-sample representation; and means for triggering operation of said reading means to read out the signal-sample representations and thereby supply said composite signal to said utilization means via said read-out path.

9. In sonar apparatus that includes a transducer for providing an echo-information signal having an amplitude that varies in accordance with received acoustic-wave echoes, and utilization means coupled to the transducer to utilize echo information contained within said signal, the combination comprising: multi-signal storage means, means to derive a pulse-signal waveform having a mark-to-space ratio that varies in accordance with the amplitude of said echo-information signal, means to write signal representations of discrete samples derived in succession from said pulse-signal waveform into said storage means for storage therein, reading means operable selectively to read out to said utilization means in succession the signal-sample representations stored in said storage means, and means for triggering operation of said reading means to read out the stored signal-sample representations to said utilization means.

10. Sonar apparatus according to claim 9 wherein said means for deriving the pulse-signal waveform comprises means for deriving a pulse train having a pulse recurrence frequency that varies in accordance with the amplitude of said echo-information signal, and monostable means responsive to said pulse train to be switched from its stable state by the successive pulses of said train.

11. Sonar apparatus according to claim 9 wherein said storage means is a multi-stage shift register.

12. In sonar apparatus that includes a transducer for providing an echo-information signal in accordance with received acoustic-wave echoes, and utilization means coupled to the transducer to utilize echo information contained within said signal, the combination comprising: storage means; writing means operative to write representations of discrete samples derived in succession from said echo-information signal into said storage means, said wriring means including clock-pulse means for clocking each successive sample-representation into said storage means; detector means coupled to said transducer to supply a control signal in response to reception by the transducer of an acoustic-wave echo having predetermined characteristics; means to terminate writing of said representations into said storage means in response to supply of said control signal by said detector means; reading means operable selectively to read out to said utilization means the signal-sample representations stored at said storage locations, said reading means including clock-pulse means for clocking the stored sample-representations out of said storage means in succession; and means for triggering operation of said reading means to read out the signal-sample representations to said utilization means.

13. Sonar apparatus comprising: transmission means operable to transmit an acoustic-wave pulse from said apparatus; echo-reception means for providing an echo-information signal in accordance with acoustic-wave echoes of said pulse; timing means switchable from a first state into a second state, said timing means being operable when switched into said second state to remain in that state for a predetermined period following the switching and then being operable to revert to said first state; means responsive to operation of said transmission means to switch said timing means to said second state; multi-signal storage means; writing means operative only while said timing means is in said second state to write representations of discrete samples derived in succession from saich echo-information signal into said storage means, said writing means including clock-pulse means for clocking each successive sample-representation into said storage means; reading means operable selectively to read out to said utilization means the signal-sample representations stored in said storage means, said reading means including clock-pulse means for clocking the stored sample-representations out of said storage means in succession; means for utilizing echo information contained in the stored sample-representations; and means for operating said reading means to read out the signal-sample representations to said utilization means.

* * * * *